UNITED STATES PATENT OFFICE 2,312,268

FLUORESCENT MATERIAL

Willard A. Roberts, Euclid, Ohio, assignor to General Electric Company, a corporation of New York No Drawing. Application January 16, 1941,
Serial No. 374,739

9 Claims. (Cl. 250—81)

The present invention relates to fluorescent lamps and is particularly directed to a new fluorescent material (phosphor) which is capable of emitting a deep red fluorescence when excited by the longer ultra-violet radiation.

In accordance with my invention, I have provided a fluorescent material comprising a base material of strontium tungstate activated with uranium. I have found that this material will fluoresce with a deep red color when subjected to ultra-violet radiations and particularly to those within the range of about 3000 Å. to 3800 Å.

In the preparation of the new fluorescent material, I fire at approximately 1000° C. for about one hour an intimate mixture of strontium oxide or sulphate, tungstic oxide, and a small percentage (about 0.1 per cent by weight) of uranium in the form of uranium salt. Examples of suitable uranium salts are uranium oxide, uranyl nitrate, uranyl carbonate, uranyl ammonium carbonate, or any like uranium salts which decompose under the influence of heat to form uranium oxide. The strontium sulphate must be in excess of that required to form strontium tungstate. The excess may be very small (of the order of 0.1 per cent) or it may be as much as three times that required for the formation of strontium tungstate. Variations of the excess quantity within this range will not materially influence the brightness of the resultant phosphor. If strontium oxide is used, the brightness of the product may be improved by the addition of sulphuric acid as described in my co-pending application Serial No. 374,739, filed January 16, 1941. The end product of the firing process may be termed a uranium-activated strontium tungstate. Its fluorescent color is about the same as that of the already known chromium-activated aluminum oxide, but the radiation to which the strontium tungstate responds, 3000 Å. to 3800 Å., is of much shorter wave length. The new material thus has the advantage that it utilizes the ultra-violet radiation within the range 3000 Å. to 3800 Å., which radiation remains unutilized with most of the fluorescent materials now common in the art.

The described fluorescent material may be applied to the interior wall of the envelope of an electrical discharge device in which ultra-violet radiations adapted to excite fluorescence in such materials are generated. Suitable binders may be used, such for example as potassium silicate or cellulose acetate. Examples of lamps in which the described fluorescent materials may be applied are described in the Patents 2,182,732 to Meyer et al. and 2,211,590 to Addink.

It will be understood that the scope of the appended claims will include many variations of relative proportions, temperatures, etc., in the described process and product which will occur to those skilled in the art to which the invention appertains.

What I claim as new and desire to secure by Letters Patent of the United States is:

1. A luminescent material comprising strontium tungstate activated with uranium.

2. A luminescent material comprising strontium tungstate activated with approximately 0.1 per cent of uranium.

3. A luminescent material comprising strontium tungstate activated with a uranium compound.

4. A luminescent material comprising strontium tungstate and activated with approximately 0.1 per cent of uranium in the form of a uranium compound.

5. The process of forming a uranium-activated strontium tungstate which comprises the steps of intimately admixing a quantity of tungstic oxide with a quantity of a strontium salt in the proportion to form strontium tungstate, adding approximately 0.1 per cent of uranium in the form of a uranium compound thereto and firing the said admixture at approximately 1000° C. for approximately one hour.

6. The process of forming a uranium-activated strontium tungstate which comprises the steps of firing at approximately 1000° C. for one hour an intimate admixture of tungstic oxide, a quantity of strontium sulphate in excess of that required to form strontium tungstate, and 0.1 per cent of uranium in the form of a uranium salt.

7. The process of forming a uranium-activated strontium tungstate which comprises the steps of firing at approximately 1000° C. for one hour an intimate admixture of tungstic oxide, a quantity of strontium sulphate in excess of that required to form strontium tungstate, and 0.1 per cent of uranium in the form of a uranium salt, taken from the group consisting of uranium oxide and uranium compounds which break down to form uranium oxide under the influence of heat.

8. A luminescent material comprising strontium tungstate containing an excess of strontium in the form of strontium sulphate.

9. A luminescent material comprising strontium tungstate activated with uranium and containing an excess of strontium in the form of strontium sulphate.

WILLARD A. ROBERTS.